United States Patent [19]

Maiden-Nesset

[11] Patent Number: 4,637,798

[45] Date of Patent: Jan. 20, 1987

[54] CHILD'S DOLL USEFUL FOR TEACHING COUNTING, COLOR IDENTIFICATION, AND FOR PROMOTING MANUAL DEXTERITY

[76] Inventor: Mary L. Maiden-Nesset, 3072 Sunflower St., Thousand Oaks, Calif. 91360

[21] Appl. No.: 667,911

[22] Filed: Nov. 2, 1984

[51] Int. Cl.⁴ ............................................. G09B 19/02
[52] U.S. Cl. .................................... 434/191; 434/207; 434/260; 434/308; 446/98
[58] Field of Search ............... 434/191, 207, 260, 308; 446/98

[56] References Cited

U.S. PATENT DOCUMENTS

| | | | |
|---|---|---|---|
| 2,501,902 | 3/1950 | Howell | 434/260 |
| 2,972,820 | 2/1961 | Cano | 434/260 |
| 2,995,865 | 4/1960 | Kiscadden | 434/260 X |
| 3,011,270 | 12/1961 | Hosbach | 434/198 |
| 3,546,788 | 12/1970 | Drumm | 434/260 |
| 3,566,481 | 3/1971 | Causer | 434/260 |
| 3,593,433 | 7/1971 | Dillon | 434/308 X |
| 3,949,488 | 4/1976 | Welch | 434/308 X |

Primary Examiner—William H. Grieb
Attorney, Agent, or Firm—Spensley Horn Jubas Lubitz

[57] ABSTRACT

Disclosed is a doll which is useful as a child's plaything, useful for teaching the child to count from 1 through 10, useful for teaching the child to identify colors, and useful to familiarize the child with various wearing apparel fasteners. The doll includes at least 10 groups of distinctive features with each group being made up of a predetermined number of similar features, the predetermined number being one of the numbers from 1 to 10, so that each number from 1 to 10 is represented by at least one such group. The doll further includes a number of distinctly colored areas and a number of different wearing apparel fasteners.

12 Claims, 4 Drawing Figures

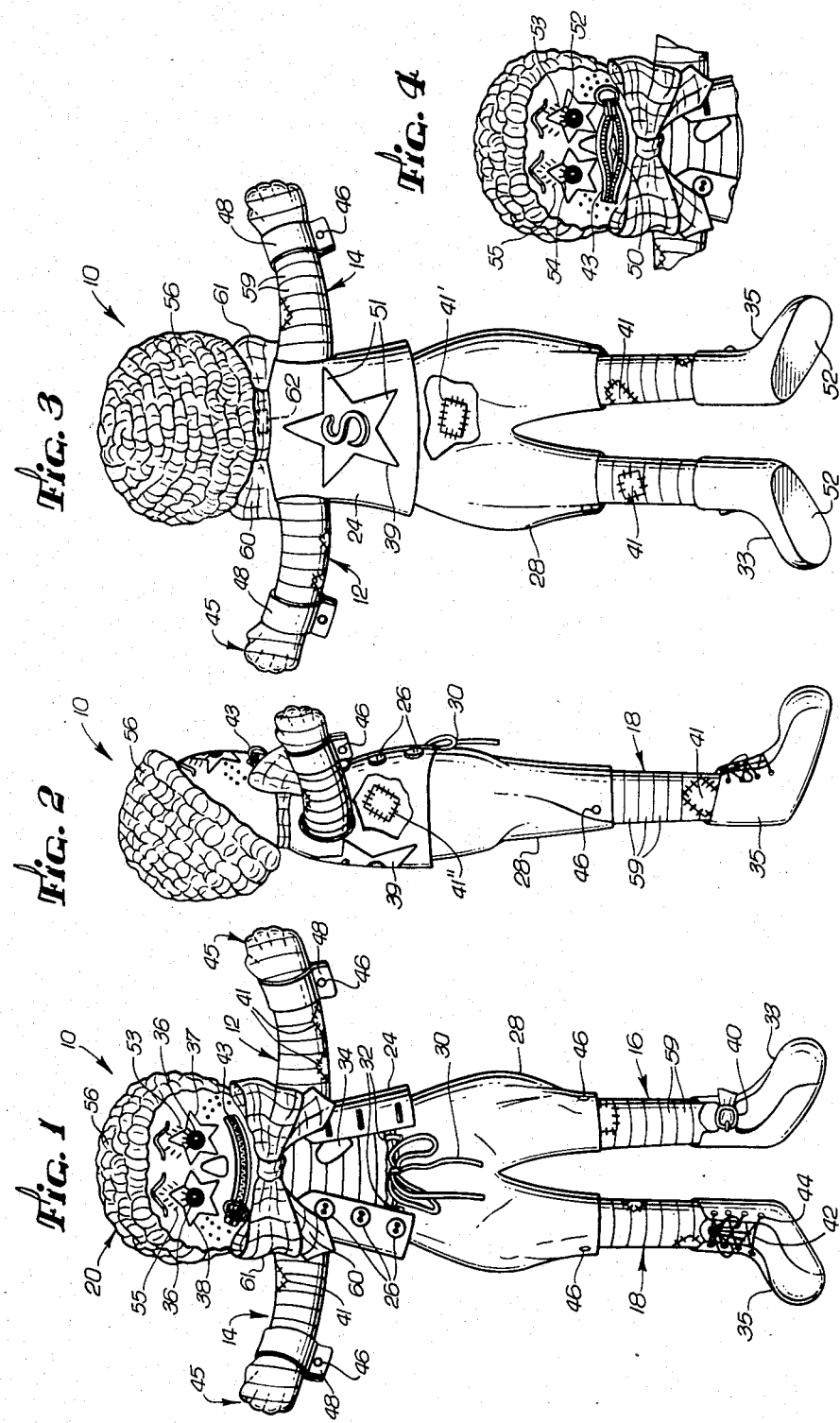

CHILD'S DOLL USEFUL FOR TEACHING COUNTING, COLOR IDENTIFICATION, AND FOR PROMOTING MANUAL DEXTERITY

BACKGROUND OF THE INVENTION

I. Field of the Invention

The invention relates to a child's doll, useful as a plaything and for teaching counting, color identification, and manipulation of various wearing apparel fasteners.

II. Discussion of Known Educational Dolls

In many known educational dolls or toys which teach counting, the numerals are actually printed on the toy itself. This can reduce the adult participation in the child's learning process. Thus, these dolls can deprive both parties of the joy and mutual benefit which flows from the teacher/pupil relationship between a parent and child. Additionally, known dolls often do not have a large variety of attractive features which encourage a child to learn color and shape identification, as well as counting, while functioning as an attractive playmate.

Another important skill for the child to learn is clothing fastener manipulation. Although several prior patents are directed to dolls with various wearing apparel fasteners for a child's manipulation, there is no known doll in which the manipulation of the wearing apparel fasteners is coordinated with the teaching of counting.

Thus what is needed is a doll which can function as a child's plaything, can be used as an aid to teach the child to count, can teach the child color identification, and can also teach the child to manipulate various wearing apparel fasteners thereby promoting the child's manual dexterity.

SUMMARY OF THE INVENTION

The invention is directed to a doll which is useful as a child's plaything and which can also be used to teach the child counting from 1 through 10 in a manner in which both the parent and the child should find quite enjoyable. This is achieved by a doll which includes at least 10 groups of distinctive features with each group being made up of a predetermined number of similar features, the predetermined number being one of the numbers from 1 through 10, wherein each number from 1 through 10 is represented by one such group.

In the illustrated embodiment, the doll also facilitates the teaching of color identification and manipulation of various wearing apparel fasteners. The illustrated doll includes a number of distinctively colored areas such that the colors yellow, black, orange, red, white, green, purple, brown, and blue, are all present on the doll. Furthermore, the doll of the illustrated embodiment includes a number of wearing apparel fasteners. For example, a zipper, a buckle, snap fasteners, a belt which can be threaded through belt loops and tied in a bow, buttons, and shoelaces which can be threaded through shoe eyelets, are all present. The doll's design encourages the child to manipulate these fasteners.

The doll is attractive and brightly colored so as to promote the child's interest in learning, and does not contain any ostensible counting or color identification aids. Thus, an adult's participation is needed, at least initially, in order that the child can learn counting and color identification.

BRIEF DESCRIPTION OF THE DRAWINGS

FIG. 1 is a front perspective view of the doll of the invention.

FIG. 2 is a side perspective view of the doll of the invention.

FIG. 3 is a rear perspective view of the doll of the invention.

FIG. 4 shows the head portion of the doll with the zipper-mouth opened.

DESCRIPTION OF A PREFERRED EMBODIMENT

Referring to the drawings, a doll 10 is shown having a left arm 12, a right arm 14, a left leg 16, a right leg 18, and a torso 22. All of these areas of the doll's body, including the hands and feet but excluding the head portion, are covered with radially extending red and white stripes 59, each of which is $\frac{1}{2}$" wide. The doll 10 further includes a head portion 20.

The doll 10 is shown wearing a vest 24 with three buttons 26, as well as pants 28 which are supported by a belt 30. It can be seen that the belt 30 is threaded through a series of belt loops 32 and that it can optionally be tied in a bow. The doll is also wearing shoes 33 and 35. All these clothing items are readily removable from the doll.

The doll includes a number of distinctive features, with the features in turn forming a number of distinct groups. For example, there is one heart-shaped area 34, two eyes 36, three stars 37, 38, and 39, two of which surround the eyes and one of which is on the back portion of the vest, three buttons 26 as previously described, four snap fasteners 46, five points 51 on each of the three stars, six eyelashes 53 over the left eye, seven eyelashes 55 over the right eye, eight shoe eyelets 44 on the right shoe 35, nine distinct patches 41 affixed to various portions of the doll's body surface, and ten distinct fingers 45.

Although it cannot be seen in the drawings, the heart-shaped area 34 is red, eyes 36 have black irises, stars 37, 38 and 39 are yellow, eyelashes 52 and 54 are black, shoe eyelets 44 are white, patches 41 are green, belt 30 is blue, the doll's hair 56 is orange, and shoes 33 and 35 are purple on the majority of the exterior surface and have brown soles 52.

The doll also includes the following wearing apparel fasteners: a mouth zipper 43, one shoe buckle 40 on shoe 33, one set of shoe laces 42 threaded through the shoe eyelets 44, and four snap fasteners 46, two of which are located at the lowermost end of each pant leg, and two of which are located on cuffs 48 which the doll is wearing on each wrist. Each cuff 48 can be removed by undoing the snap fasteners 46. As can be seen in FIG. 4, when the zipper 43 is opened, a tongue 50 is revealed.

When an adult wishes to teach the child to count using the doll, the adult will sequentially indicate the various groups of features (beginning with the one heart-shaped area 34) while at the same time telling the child the number to which the feature(s) corresponds. For example, the adult would point to heart 34 and tell the child, "this is 1". Then the adult would point to the two eyes 36, and indicate to the child that this group of features represents "2". The counting would precede in this fashion until reaching "9".

As can be seen in FIGS. 2 and 3, a patch 41', which is located on the seat portion of the doll, and a patch 41", which is located on the right flank, are both hidden from view when the doll is fully clothed. Thus, in order to count to "9" on the doll, the child must open the buttons 26, untie the bow in belt 30, and partially remove the pants 28 and the vest 24. The child is thereby encouraged to learn both counting and manipulation of these types of fasteners.

The adults can thereafter work with the child until the child grasps the concept of counting with the doll. In a similar manner to that described above, the child can also be taught color identification. Because the doll is brightly colored and an attractive playmate, the child will likely be encouraged to learn color identification. Both parties receive benefit from these procedures and their relationship will likely be strengthened.

As a further feature, the doll encourages manipulation of wearing apparel fasteners. As explained above, in order to learn to count to nine the child must manipulate buttons 26 and the bow in the belt 30. The child will also be encouraged to manipulate zipper 43 in order to view the tongue 50. The child's natural curiosity will also likely compel him to remove various portions of the doll's wearing apparel, and he will thus be encouraged to manipulate snap fasteners 46, the buckle 40 on the shoe 43, and the bow in the shoelace 42.

There are also included a plurality of squares 60 on a bow-tie 61 the doll is wearing. Each square has an area of one square inch. The ½ inch red and white stripes 59 and the one inch square 60 are used to teach the child units of measure. The bow-tie 61 is attached to the back of the doll's neck by a hook and loop (Velcro) fastener 62 (FIG. 3) which provides additional fastener manipulation experience for the child.

Still further, the child may learn to distinguish right from left since the right shoe 35 has laces 42 while the left shoe 33 has a buckle 40. Similarly, the left arm has two patches while the right arm has one patch.

As will be appreciated by those skilled in the art, many modifications and variations of the doll are possible. By way of example and not of limitation, it would be possible to include some wearing apparel fasteners and not others, some colors and not others, or a greater or lesser number of groups of distinctive features. Accordingly, other modifications and variations of the invention are possible and the terms and expressions used herein are terms of description only and not of limitation, the invention being limited only by the scope of the claims which follow.

What is claimed is:

1. A doll useful as a child's plaything and also for teaching a child to count from 1 through 10, comprising:
   a. two legs, two arms, a torso, and a head portion; and
   b. at least ten groups of distinctive features, each group comprising a predetermined number of similar features, and said predetermined number being one of the numbers from one to ten so that each number from one to ten is represented by at least one such group;
   wherein said ten groups comprise the following features:
   a. one heart-shaped area;
   b. two eyes;
   c. three stars;
   d. four snap fasteners;
   e. five distinct points on each of said stars;
   f. six eyelashes over one of the eyes;
   g. seven eyelashes over the other of the eyes;
   h. eight shoe eyelets;
   i. nine distinct patches;
   j. ten distinct fingers.

2. The doll of claim 1 wherein:
   a. said heart-shaped area is red;
   b. said two eyes are black and are each surrounded by one of said stars;
   c. said stars are yellow;
   d. said limbs are red and white striped;
   e. said eyelashes are black;
   f. said eyelets are white;
   g. said patches are green.

3. A doll useful as a child's plaything, useful for teaching the child to count from one to ten, and useful to improve a child's manual dexterity and familiarize the child with various types of wearing apparel fasteners, comprising:
   a. two legs, two arms, a torso, a shoelace and a head portion;
   b. at least ten groups of distinctive features, each group comprising a predetermined number of similar features, and said predetermined number being one of the numbers from one to ten so that each number from one through ten is represented by one such group;
   c. at least one zipper;
   d. at least one snap fastener;
   e. a removable belt which can be tied in a bow;
   f. at least one buckle fastener;
   g. a series of shoe eyelets through which the shoelace can be passed, wherein the shoelace can be tied in a bow;
   wherein the ten distinct groups comprise the following features:
   a. one heart-shaped area on the torso;
   b. two star-shaped eyes;
   c. three stars wherein two of said stars form a portion of said pair of star-shaped eyes;
   d. four snap fasteners;
   e. five points on at least one of said stars;
   f. six eyelashes over one eye;
   g. seven eyelashes over the other eye;
   h. eight shoe eyelets;
   i. nine patches;
   j. ten fingers.

4. The doll of claim 3 wherein at least one of the patches is located on a portion of the doll which is hidden from view when the doll is fully clothed such that at least one of a bow or a button must be unfastened in order to view said patch.

5. A doll useful as a child's plaything, useful for teaching the child to count from one to ten, and useful for teaching the child to identify colors, comprising at least ten groups of distinctive features, each group comprising a predetermined number of similar features, and said predetermined number being one of the numbers from one to ten, so that each number from one to ten is represented by one such group, wherein the color of each of said features within said group is the same and wherein said groups comprise the following:
   a. one red heart-shaped area;
   b. two yellow star-shaped eyes;
   c. three yellow buttons;
   d. four purple snap fasteners;
   e. five distinct points on each star;
   f. six black eyelashes over one of two eyes;
   g. seven black eyelashes over the other eye;
   h. eight white eyelets on a shoe;
   i. nine green patches; and j. ten red and white striped fingers.

6. A doll useful as a child's plaything, for teaching the child to count from 1 through 10, useful to familiarize the child with various types of wearing apparel fasteners, and useful for teaching a child to identify eight basic colors, comprising:
   a. two legs, two arms, a torso, and a head portion;
   b. at least 10 groups of distinctive features with each group being made up of a unique number of similar features, said unique number being one of the numbers from 1 to 10, so that each number from 1 to 10 is represented by one such group, wherein the color of each of said features within each said group is the same and is one of red, black, yellow, white, green, or red and white striped; and
   c. said doll further includes at least one zipper, at least one snap fastener, a removable belt which can be tied in a bow, a buckle fastener, and a shoelace and a series of shoe eyelets, through which the shoelace can be passed and tied in a bow; and
   further including portions of the doll which are any of purple, brown, orange or blue; and
   wherein said groups comprise:
   a. one heart-shaped red area on the torso;
   b. two star-shaped eyes with black irises;
   c. three yellow stars wherein two of said stars form a portion of said star-shaped eyes;
   d. four red and white striped limbs;
   e. five points on each of said stars;
   f. six black eyelashes over one eye;
   g. seven black eyelashes over the other eye;
   h. eight white shoe eyelets;
   i. nine green patches;
   j. ten distinct fingers.

7. The doll of claim 6 further including orange hair, a blue belt, and shoes which are brown and purple.

8. The doll of claim 6, wherein:
   a. the zipper is located so as to correspond to the doll's mouth and when the zipper is opened a tongue is revealed;
   b. said fasteners are located on each of the lower ends of each pant leg of a doll's pants and also on a cuff which the doll wears on each wrist, the pants and cuffs both being removable;
   c. said belt is threaded through a set of belt loops at the waist portion of the doll's pants;
   d. said buckle fastener is located on a shoe which can be removed from the doll's foot;
   e. said buttons are located on a removable vest;
   f. said shoe eyelets are located on a removable shoe.

9. The doll of claim 6 wherein a portion of the doll corresponding to the hair is orange, a portion corresponding to the eyes is both yellow and black, a portion corresponding to the nose and mouth is red, the doll has a number of green patches on its outer surface, a removable belt is blue, and wherein the doll has red and white stripes on the outer surface of its body and a pair of removable shoes which are purple on the majority of the outer surface thereof and brown on the exterior sole portion thereof.

10. The doll of claim 6 wherein at least one of said features is located on a portion of the doll which is hidden from view when the doll is fully clothed such that at least one of a bow or a button must be unfastened in order to view said feature.

11. The doll of claim 6 further comprising indicia of units of measurement.

12. The doll of claim 6 further comprising indicia for distinguishing right from left.

* * * * *